(12) United States Patent
Francescangeli et al.

(10) Patent No.: US 10,958,465 B2
(45) Date of Patent: Mar. 23, 2021

(54) SYSTEM, METHOD, APPARATUS, AND COMPUTER PROGRAM PRODUCT FOR CONFIGURING A NETWORK CONNECTED APPLIANCE TO USE ONLINE SERVICE

(71) Applicant: ELECTROLUX HOME PRODUCTS, INC., Charlotte, NC (US)

(72) Inventors: Giorgio Francescangeli, Charlotte, NC (US); Thomas Schulz, Charlotte, NC (US)

(73) Assignee: Electrolux Home Products, Inc., Charlotte, NC (US)

( * ) Notice: Subject to any disclaimer, the term of this patent is extended or adjusted under 35 U.S.C. 154(b) by 94 days.

(21) Appl. No.: 16/451,912

(22) Filed: Jun. 25, 2019

(65) Prior Publication Data

US 2019/0319817 A1 Oct. 17, 2019

Related U.S. Application Data

(63) Continuation of application No. 15/186,101, filed on Jun. 17, 2016, now Pat. No. 10,367,651, which is a
(Continued)

(51) Int. Cl.
*H04L 12/28* (2006.01)
*H04L 12/24* (2006.01)
(Continued)

(52) U.S. Cl.
CPC ...... *H04L 12/2809* (2013.01); *H04L 12/2825* (2013.01); *H04L 12/2829* (2013.01); *H04L 41/0806* (2013.01); *H04L 41/20* (2013.01); *H04L 51/22* (2013.01); *H04L 67/306* (2013.01); *H04L 69/16* (2013.01)

(58) Field of Classification Search
None
See application file for complete search history.

(56) References Cited

U.S. PATENT DOCUMENTS 7,349,967 B2 3/2008 Wang
7,526,539 B1 4/2009 Hsu
(Continued)

OTHER PUBLICATIONS

International Preliminary Report on Patentability dated Jun. 21, 2016 in International Application No. PCT/US2014/070560.
(Continued)

*Primary Examiner* — Brian Whipple
(74) *Attorney, Agent, or Firm* — Womble Bond Dickinson (US) LLP

(57) ABSTRACT

A system, method, apparatus, and computer program product for configuring a network connected appliance to use online services are disclosed. A method may include receiving an indication of a selected home automation system for a network connected appliance. The selected home automation system may be selected from multiple available home automation systems. The method may additionally include registering the network connected appliance to the selected home automation system. The method may also include enabling communication between the network connected appliance and the selected home automation system.

20 Claims, 9 Drawing Sheets

Related U.S. Application Data continuation of application No. PCT/US2014/070560, filed on Dec. 16, 2014.

(60) Provisional application No. 61/918,176, filed on Dec. 19, 2013.

(51) Int. Cl.
  *H04L 12/58* (2006.01)
  *H04L 29/08* (2006.01)
  *H04L 29/06* (2006.01)

(56) References Cited

U.S. PATENT DOCUMENTS

| | | |
|---|---|---|
| 7,715,325 B2 | 5/2010 | Lee et al. |
| 8,280,009 B2 | 10/2012 | Stepanian |
| 8,301,625 B2 | 10/2012 | Sugaya |
| 8,335,842 B2 | 12/2012 | Raji et al. |
| 2001/0048373 A1 | 12/2001 | Sandelman |
| 2002/0128728 A1* | 9/2002 | Murakami .......... H04L 41/0677 700/10 |
| 2003/0041107 A1 | 2/2003 | Blattner et al. |
| 2004/0010561 A1 | 1/2004 | Kim et al. |
| 2004/0157544 A1 | 8/2004 | Moon et al. |
| 2005/0080879 A1 | 4/2005 | Kim et al. |
| 2005/0201393 A1 | 9/2005 | Hatayama et al. |
| 2006/0223569 A1 | 10/2006 | Collmeyer et al. |
| 2007/0268121 A1 | 11/2007 | Vasefi et al. |
| 2009/0150356 A1 | 6/2009 | Walker |
| 2009/0316671 A1 | 12/2009 | Rolf et al. |
| 2012/0109384 A1 | 5/2012 | Stepanian |
| 2012/0191257 A1 | 7/2012 | Corcoran et al. |
| 2012/0303137 A1 | 11/2012 | Schoeller et al. |
| 2013/0052946 A1 | 2/2013 | Chatterjee et al. |
| 2013/0086232 A1 | 4/2013 | Hwang et al. |
| 2013/0173811 A1 | 7/2013 | Ha et al. |
| 2013/0289751 A1 | 10/2013 | Mignot et al. |
| 2014/0169218 A1 | 6/2014 | Heintz et al. |
| 2014/0191855 A1* | 7/2014 | Kim ................ G08C 17/02 340/12.54 |
| 2015/0180993 A1* | 6/2015 | Yamada ............ G06F 16/951 709/223 |
| 2017/0099357 A1 | 4/2017 | Haupt et al. |

OTHER PUBLICATIONS

International Search Report dated Mar. 17, 2015 for application No. PCT/US2014/070560.

* cited by examiner

SYSTEM, METHOD, APPARATUS, AND COMPUTER PROGRAM PRODUCT FOR CONFIGURING A NETWORK CONNECTED APPLIANCE TO USE ONLINE SERVICE

CROSS-REFERENCE TO RELATED APPLICATION(S)

The present application is a continuation of U.S. patent application Ser. No. 15/186,101, filed Jun. 17, 2016, which is a continuation of International Application No. PCT/US2014/070560, filed Dec. 16, 2014, which claims priority to U.S. Provisional Application No. 61/918,176, filed Dec. 19, 2013, all of which are incorporated herein by reference in their respective entireties and for all purposes.

FIELD OF THE DISCLOSURE

Aspects of the disclosure relate to appliance technology and, more particularly, to a system, method, apparatus, and computer program product for configuring a network connected appliance to use online services.

BACKGROUND

In recent years, there has been rapid advancement in low cost home networking solutions as well as increasing consumer sophistication in deploying and maintaining home local area networks (LANs), such as wireless local area networks (WLANs). As a result, home local area networks are now ubiquitous and an increasing number of consumer products now offer networking capability supporting connectivity to a home local area network, as progress continues to be made toward the conceptual "connected home" in which a multitude of consumer devices within a home are interconnected via a network for purposes of information sharing and automation among multiple devices in a home. For example, many household appliances now offer network connectivity supporting connectivity to a home local area network as well as communication with devices outside the home local area network via the Internet.

SUMMARY

A system, method, apparatus, and computer program product for configuring a network connected appliance to use online services are disclosed. For example, some embodiments provide for configuring an appliance to use a selected home automation service. More particularly, some example embodiments provide a service portal which may be configured to allow a user to select a desired home automation system from a plurality of available home automation system and to enable communication between the network connected appliance and the selected home automation system such that the network connected appliance may leverage services offered by the selected home automation system. As a further example, some embodiments provide for establishing an association between a network connected appliance and a user account to enable the usage of the network connected appliance with online services associated with the user account.

The present disclosure thus includes, without limitation, the following example embodiments:

Example Embodiment 1

A method for configuring an appliance to use a home automation system, wherein such method comprises receiving an indication of a selected home automation system for a network connected appliance, the selected home automation system being selected from a plurality of available home automation systems; registering the network connected appliance to the selected home automation system; and enabling communication between the network connected appliance and the selected home automation system, and wherein at least one method operation is performed by a processor.

Example Embodiment 2

The method of any preceding or subsequent example embodiment, or combinations thereof, wherein enabling communication between the network connected appliance and the selected home automation system comprises serving as an intermediary for communication between the network connected appliance and the selected home automation system.

Example Embodiment 3

The method of any preceding or subsequent example embodiment, or combinations thereof, wherein enabling communication between the network connected appliance and the selected home automation system comprises remotely configuring the network connected appliance via a network to communicate with the selected home automation system.

Example Embodiment 4

The method of any preceding or subsequent example embodiment, or combinations thereof, wherein remotely configuring the network connected appliance comprises provisioning the network connected appliance with software configured to facilitate communication between the network connected appliance and the selected home automation system.

Example Embodiment 5

The method of any preceding or subsequent example embodiment, or combinations thereof, wherein remotely configuring the network connected appliance comprises activating a pre-installed software module on the network connected appliance, wherein the pre-installed software module is configured to facilitate communication between the network connected appliance and the selected home automation system.

Example Embodiment 6

The method of any preceding or subsequent example embodiment, or combinations thereof, further comprising, creating an account with the selected home automation system for a user associated with the network connected appliance in an instance in which the user does not have an account with the selected home automation system.

Example Embodiment 7

The method of any preceding or subsequent example embodiment, or combinations thereof, further comprising receiving an identifier associated with a user account of a user associated with the network connected appliance, the identifier being sent by the network connected appliance;

and establishing an association between the network connected appliance and the user account based at least in part on the identifier.

Example Embodiment 8

The method of any preceding or subsequent example embodiment, or combinations thereof, further comprising provisioning the identifier to a user device associated with the user, wherein the identifier is provisioned to the network connected appliance by the user device prior to being sent by the network connected appliance.

Example Embodiment 9

The method of any preceding or subsequent example embodiment, or combinations thereof, further comprising causing the plurality of available home automation systems to be presented as selectable options via an interface in response to establishment of the association between the network connected appliance and the user account.

Example Embodiment 10

The method of any preceding or subsequent example embodiment, or combinations thereof, wherein the method is performed by a computer system configured to provide a network accessible service portal, and wherein a user associated with the network connected appliance has a user account with the service portal.

Example Embodiment 11

The method of any preceding or subsequent example embodiment, or combinations thereof, wherein receiving the indication of the selected home automation system comprises receiving an indication sent by a user device associated with the user, wherein the user device is logged into the user account on the service portal.

Example Embodiment 12

A method for associating a network connected appliance with a user account, wherein such a method comprises a computing device connected to a local area network, identifying a network connected appliance on the local area network that is not associated with the user account; and provisioning the network connected appliance with an identifier associated with the user account, wherein the identifier is usable by the network connected appliance to send to a service portal to establish an association between the network connected appliance and the user account, and wherein at least one method operation is performed by a processor.

Example Embodiment 13

The method of any preceding or subsequent example embodiment, or combinations thereof, wherein the identifier is an email address.

Example Embodiment 14: The method of any preceding or subsequent example embodiment, or combinations thereof, further comprising the computing device sending an indication to the service portal that a new network connected appliance is to be associated with the user account; and receiving the identifier in response to the indication, the identifier being generated by the service portal for the network connected appliance.

Example Embodiment 15

The method of any preceding or subsequent example embodiment, or combinations thereof, further comprising the computing device accessing the service portal under the user account.

Example Embodiment 16

The method of any preceding or subsequent example embodiment, or combinations thereof, wherein provisioning the network connected appliance with the identifier comprises using a transport layer protocol to send the identifier to the network connected appliance over the local area network.

Example Embodiment 17

The method of any preceding or subsequent example embodiment, or combinations thereof, wherein the transport layer protocol comprises one of user datagram protocol (UDP) or transmission control protocol (TCP).

Example Embodiment 18

The method of any preceding or subsequent example embodiment, or combinations thereof, wherein provisioning the network connected appliance with the identifier comprises sending the identifier to the network connected appliance via socket communication over the local area network.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will therefore be appreciated that the above Summary is provided merely for purposes of summarizing some example embodiments so as to provide a basic understanding of some aspects of the disclosure. As such, it will be appreciated that the above described example embodiments are merely examples of some embodiments and should not be construed to narrow the scope or spirit of the disclosure in any way. It will be appreciated that the scope of the disclosure encompasses many potential embodiments, some of which will be further described below, in addition to those here summarized. Further, other aspects and advantages of embodiments disclosed herein will become apparent from the following detailed description taken in conjunction with the accompanying drawings which illustrate, by way of example, the principles of the described embodiments.

BRIEF DESCRIPTION OF THE DRAWINGS

Figure 1:
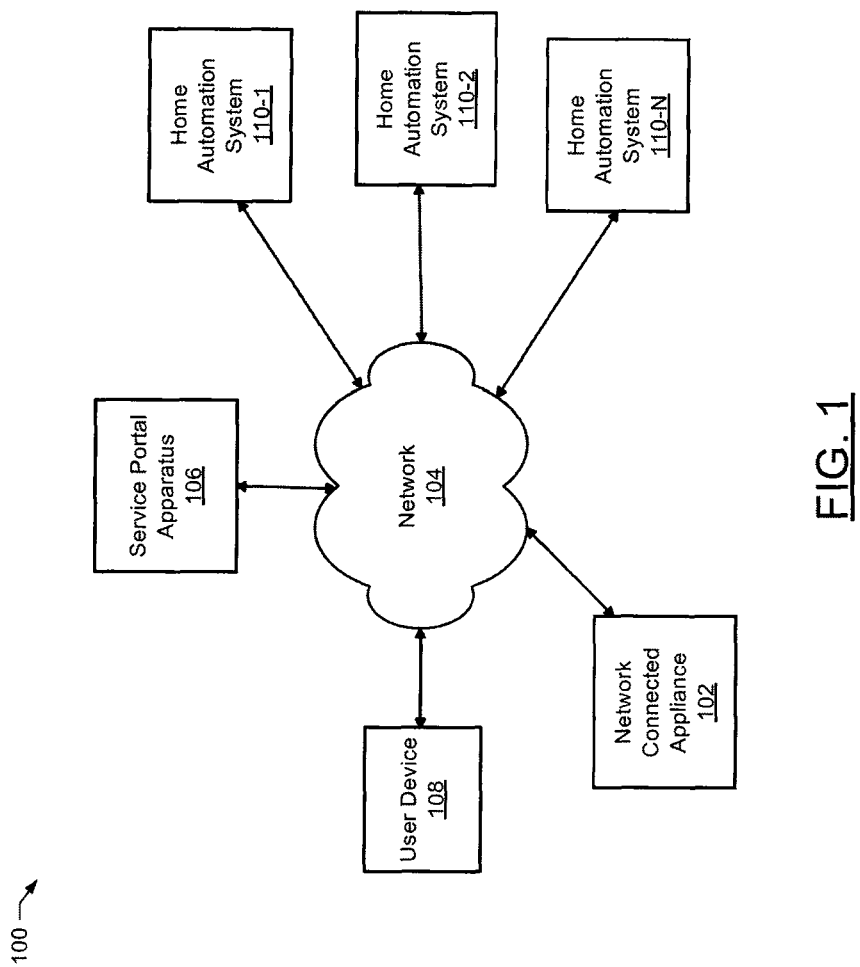
Figure 2:
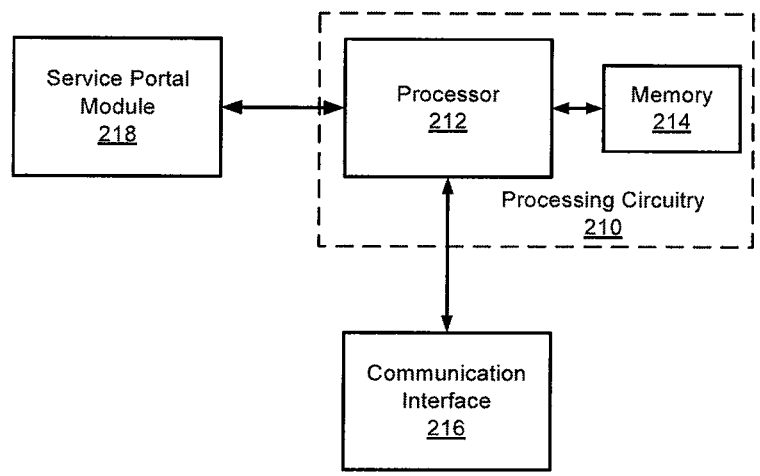
Figure 3:
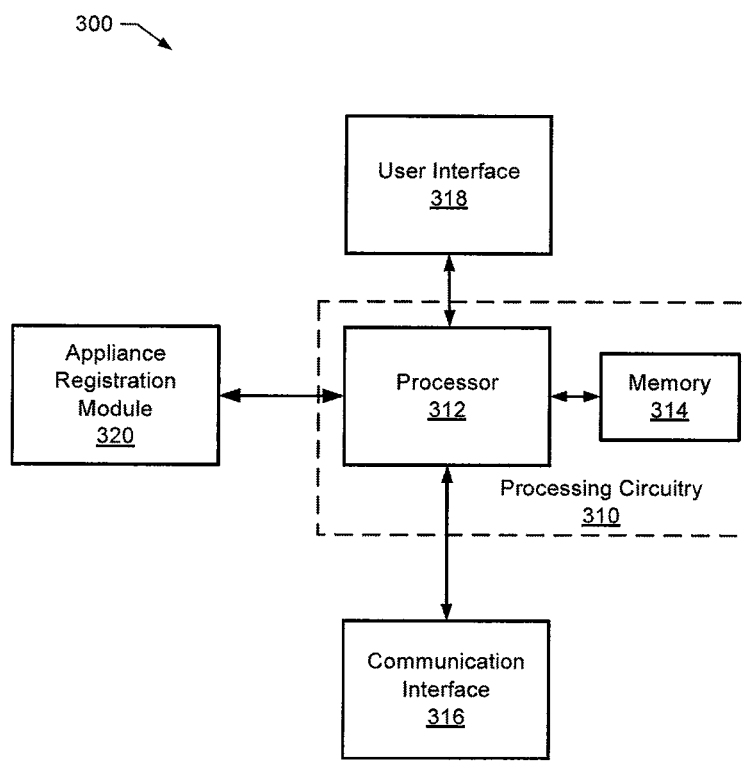
Figure 4:
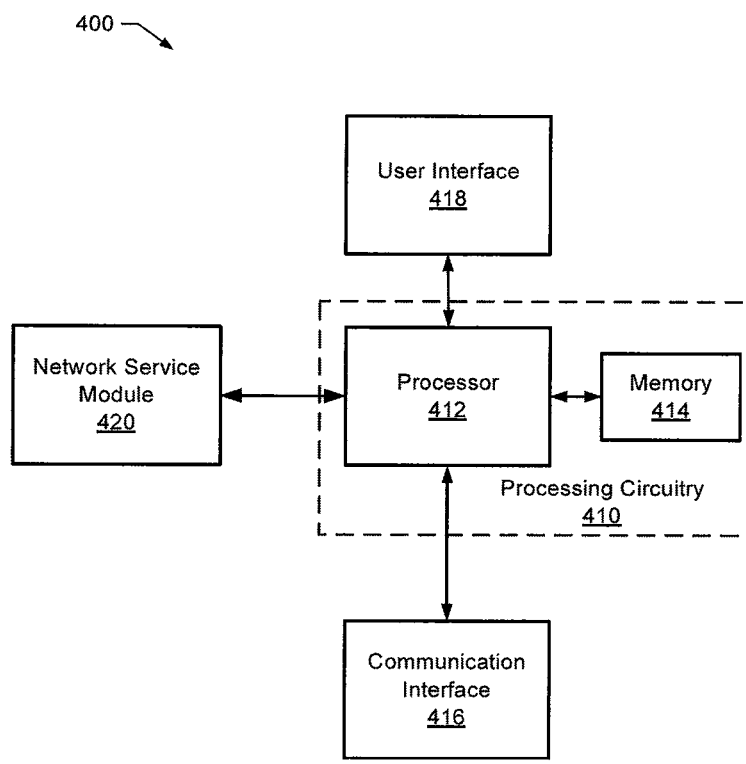
Figure 5:
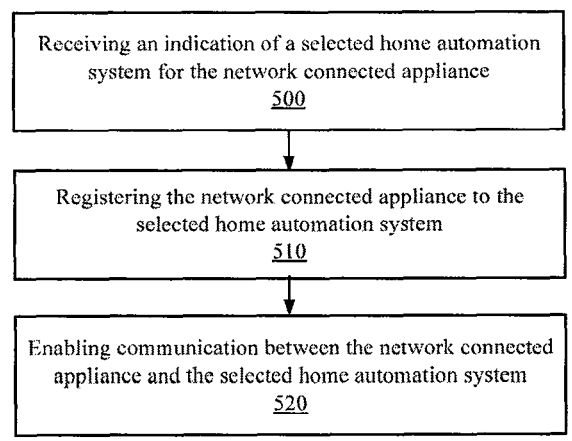
Figure 6:
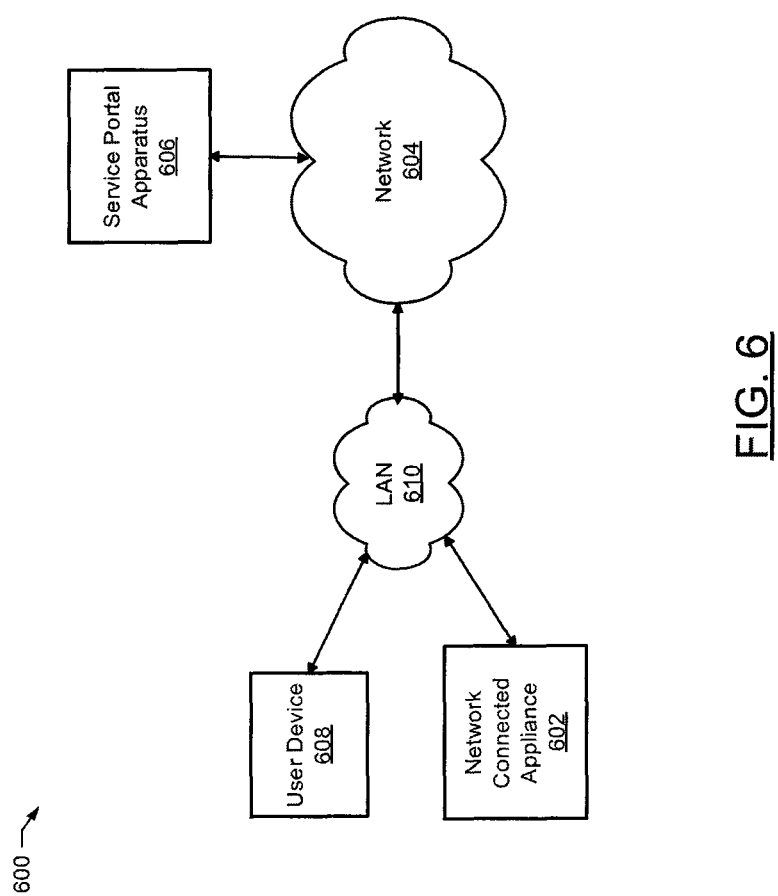
Figure 7:
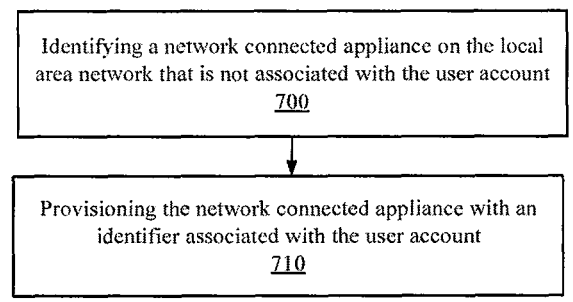
Figure 8:
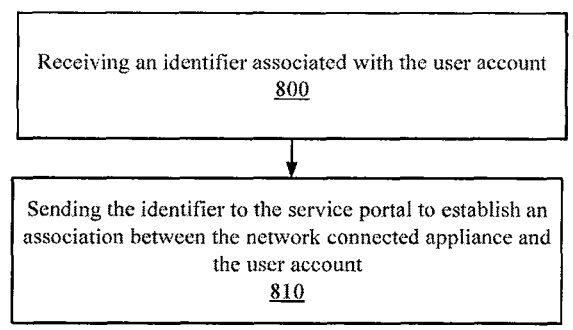
Figure 9:
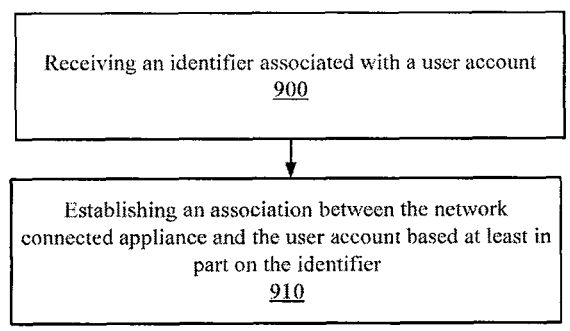

Having thus described the disclosure in general terms, reference will now be made to the accompanying drawings, which are not necessarily drawn to scale, and wherein:

FIG. 1 illustrates a system for configuring a network connected appliance to use a home automation system in accordance with some example embodiments;

FIG. 2 illustrates a block diagram of an apparatus that may provide a service portal in accordance with some example embodiments;

FIG. 3 illustrates a block diagram of an apparatus that may be implemented on a user device in accordance with some example embodiments;

FIG. 4 illustrates a block diagram of an apparatus that may be implemented on a network connected appliance in accordance with some example embodiments;

FIG. 5 illustrates a flowchart according to an example method for configuring a network connected appliance to use a home automation system in accordance with some example embodiments;

FIG. 6 illustrates a system for associating a network connected appliance with a user account in accordance with some example embodiments;

FIG. 7 illustrates a flowchart according to an example method that may be performed by a user device to facilitate establishment of an association between a network connected appliance and a user account in accordance with some example embodiments;

FIG. 8 illustrates a flowchart according to an example method that may be performed by a network connected appliance to establish an association between the network connected appliance and a user account in accordance with some example embodiments; and FIG. 9 illustrates a flowchart according to an example method that may be performed by a service portal apparatus to establish an association between a network connected appliance and a user account in accordance with some example embodiments.

DETAILED DESCRIPTION

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

FIG. 1 illustrates a system 100 for configuring a network connected appliance to use a home automation system in accordance with some example embodiments. The system 100 may include one or more network connected appliances 102, with one such network connected appliance 102 being illustrated in FIG. 1 by way of example. Each such network connected appliance 102 may be any of a variety of appliances. By way of example, in some embodiments, a network connected appliance 102 may be a household appliance, such as by way of non-limiting example, a dishwasher, washing machine, clothes dryer, refrigerator, freezer, oven, range, cooktop, microwave oven, trash compactor, air conditioner, water heater, some combination thereof, or other household appliance.

The network connected appliance 102 may be connected to a network 104. The network 104 may be embodied as any network, or combination of networks, which may enable two or more computing devices to communicate with each other. In this regard, the network 104 may, for example, comprise one or more wireline networks, one or more wireless networks (e.g., a cellular network, WLAN, wireless wide area network, some combination thereof, or the like), or a combination thereof, and in some example embodiments may comprise the Internet.

The network connected appliance 102 may be connected to the network 104 through any of a variety of network connectivity means. For example, in some embodiments, such as that illustrated in and described further below with respect to FIG. 6, a network connected appliance 102 may include a communication interface supporting a connection to a home LAN, such as a WLAN, a wired LAN, a power line network, some combination thereof, or other LAN, which may, in turn, be interfaced with a wide area network, such as the Internet. As another example, in some embodiments, a network connected appliance 102 may include a cellular communication interface supporting a cellular connection to the network 104. It will be appreciated, however, that any technology that may be used to connect a device to a network is contemplated within the scope of the disclosure.

In embodiments in which the network connected appliance 102 is connected to a WLAN requiring a network access credential(s), such as a service set identifier (SSID) and/or other network identifier, a password, and/or other credential(s) that may be used to access a WLAN, the network connected appliance 102 may be provisioned with the network access credential(s) to configure the network connected appliance 102 to access the WLAN. For example, in some embodiments, a user may use a protocol, such as WiFi Protected Setup (WPS), to provision a network access credential(s) for the WLAN from a wireless router or other access point for the WLAN to the network connected appliance 102.

Additionally or alternatively, in some embodiments, the network connected appliance 102 may be provisioned with a network access credential(s) for a WLAN through operation in a soft access point (AP) mode. In this regard, the network connected appliance 102 of some example embodiments may be configured to function in a soft AP mode in which the network connected appliance 102 may serve as a wireless access point that may be accessed by another computing device, such as user device 108, that may be within sufficient proximity of the network connected appliance 102 to exchange wireless communications, such as in accordance with an Institute of Electrical and Electronics Engineers (IEEE) 802.11 standard. When accessed in soft AP mode, the network connected appliance 102 of such example embodiments may provide access to a web page or other interface enabling a user to enter network access credentials for a WLAN to configure the network connected appliance 102 to access the WLAN. For example, the interface of some such embodiments may be accessed via domain name, Internet Protocol (IP) address, and/or the like and viewed in a web browser on a computing device connected to the network connected appliance 102 in soft AP mode. In some such embodiments, the interface may include an option to perform a scan to discover local WLANs, which may be used to discover and select the WLAN to which the network connected appliance 102 is to be connected. Additionally or alternatively, in some embodiments, the interface may enable a user to enter an SSID and/or other identifier for the desired WLAN. The interface may further allow the user to enter any password and/or other credential that may be needed to access the desired WLAN. The network connected appliance 102 may store the supplied network access credential(s) and may use the network access credential(s) to connect to the WLAN (e.g., in a wireless station (STA) mode).

The system 100 may further include a service portal apparatus 106, which may be embodied as a computer system accessible by the network 104, which may comprise one or more computing devices that may be configured to provide a service portal in accordance with one or more example embodiments. The service portal apparatus 106 may include one or more servers, such as may be provided by one or more blade servers, a cloud computing infrastructure, and/or the like, which may be collectively configured to provide a service portal in accordance with one or more example embodiments. In some example embodiments in which the service portal apparatus 106 is embodied as a distributed computing apparatus comprising multiple computing devices, such as may be used to provide a cloud computing infrastructure, the respective devices that comprise the service portal apparatus 106 of such embodiments may be in communication with each other via a network, such as the network 104.

The service portal that may be provided by the service portal apparatus 106 may provide services for network connected appliances 102. For example, in some embodiments, the service portal may be operated by a manufacturer of a network connected appliance 102, a vendor of a network connected appliance 102, and/or other entity that may have an interest in the manufacture, distribution, and/or maintenance of a network connected appliance 102. The service portal may provide an interface enabling a user to access and use features of the service portal, such as management features for management of a network connected appliance 102. For example, a user may be able to remotely control one or more functionalities of a network connected appliance 102, monitor operation of a network connected appliance 102, initiate a service request for a network connected appliance 102, and/or perform other management tasks via the interface.

The interface that may be provided by the service portal apparatus 102 may be accessed over the network 104 via a user device 108, which may be associated with an owner or other user of one or more network connected appliances 102. For example, the interface may comprise a web-based interface that may be accessed via a thin client and/or other client application that may be installed on the user device 108. As a more particular example, in some embodiments, the customization service apparatus may provide a web page that may be accessed by a browser application that may be installed on the user device 108. As another example, in some embodiments, the user device 108 may have a dedicated application (e.g., a mobile app in some embodiments in which the user device 108 is embodied as a mobile computing device) that may be configured to access and/or otherwise interact with a web-based interface or other interface that may be provided by the service portal apparatus 106.

The user device 108 may be embodied as may be embodied as any computing device that may be used by a user and that may be configured to access the network 104. By way of non-limiting example, a user terminal 108 may be embodied as a personal computer (e.g., desktop computer, laptop computer, or other personal computer), a mobile computing device (e.g., a smart phone, tablet computer, digital camera, some combination thereof, or other mobile computing device), or the like. The user terminal 108 may be configured to use any of a variety of network access technologies to access the network 104 in various embodiments, including, by way of non-limiting example, a LAN access technology, such as a WLAN access technology, a cellular access technology, and/or other wireless and/or wireline network access technology. In some example embodiments, such as that illustrated in and described further below with respect to FIG. 6, the user device 108 and network connected appliance 102 may both use a common LAN to access the network 104.

A user of the user device 108 may have a user account with the service portal that may be provided by the service portal apparatus 106. For example, in some embodiments, a user may access the service portal and register for an account. The account may be identified by an identifier, such as a user name, email address, and/or other identifier which may be used to uniquely identify a user account on the service portal.

In some example embodiments, a user that has registered an account with the service portal may download an application to the user device 108, which may provide management features for managing a network connected appliance 102. For example, in some such embodiments, the application may be configured to enable interaction with the service portal interface, such as to manage network connected appliances 102, via the user device 108. In this regard, in some embodiments, a user my log into his or her account with the service portal via the application and may perform management functions from the user device 108. As another example, in some such embodiments, the application may additionally or alternatively be configured to enable the user device 108 to recognize and communicate with a network connected appliance 102, such as over a LAN.

The user may associate (e.g., register) network connected appliances 102 that are owned by and/or otherwise associated with the user to the user's account with the service portal. In this regard, association of a network connected appliance 102 with a user account may enable management of the network connected appliance 102 via the service portal by the user.

Association of a network connected appliance 102 to a user account may, for example, include establishing an association between the user account and an identifier, such as a serial number, media access control (MAC) address, part number, and/or other identifier that may be associated with the network connected appliance 102 and which may be used to uniquely identify the network connected appliance 102. The association between an identifier for the network connected appliances 102 and the user account may be maintained by the service portal apparatus 106 to enable the service portal apparatus 106 to recognize and communicate with network connected appliances 102 associated with a given user account.

In some example embodiments, a network connected appliance 102 may additionally or alternatively be provisioned with an identifier having a predefined association with the user account. In this regard, an identifier having a predefined association with the user account may be known to the service portal apparatus 106 and, when presented to the service portal apparatus 106 by a network connected appliance 102, the service portal apparatus 106 may recognize that the network connected appliance 102 is associated with the user account with which the identifier is associated. As such, the network connected appliance 102 of such example embodiments may communicate with the service portal apparatus 106 via the network 104 and may present the identifier to indicate the user account with which the network connected appliance 102 is associated.

For example, in some embodiments, a user may select via an application on the user device 108 and/or via the service portal interface to establish a new association between a network connected appliance 102 and the user's account.

The service portal apparatus 106 may be configured, in response, to generate a virtual serial number (VSN), which may be associated with the user's account, and may provision the VSN to the user device 108. The user device 108 may, in turn, provision the VSN to the network connected appliance 102, such as via a LAN. The network connected appliance 102 may store the VSN, and may present the VSN to the service portal apparatus 106 to establish the association between the network connected appliance 102 and the user's account.

As another example, in some embodiments, the user device 108 may be configured to provision an account identifier, such as an email address, account user name, and/or other identifier that may be used to uniquely identify a user account with the service portal to the network connected appliance 102. The network connected appliance 102 may store the identifier, and may present the identifier to the service portal apparatus 106 to establish the association between the network connected appliance 102 and the user's account.

Some example embodiments in which the user device 108 may provision an identifier, such as a VSN, account identifier, and/or the like to a network connected appliance 102 to enable establishment of an association between the network connected appliance 102 and a user account are illustrated in and described further herein below with respect to FIGS. 6-9.

The service portal interface that may be provided by the service portal apparatus 106 in accordance with some example embodiments may be further configured to enable a user to select a home automation system to use with a network connected appliance 102 that is associated with the user's account. In this regard, the system 100 of some embodiments may further comprise a plurality of home automation systems 110 (e.g., N home automation systems 110, where N may be any number two or more). Three such home automation systems 110 (e.g., home automation system 110-1, home automation system 110-2, and home automation system 110-N) are illustrated by way of example in FIG. 1.

A home automation system 110 may be any home automation system offering home automation, also known as home management services. By way of non-limiting example, one of the home automation systems 110 may be the Lowes® Iris® Home Management System. A home automation system 110 may be embodied as a computing system, such as one or more servers, a cloud computing infrastructure, and/or other computing platform, which may be configured to provide home automation services.

In some embodiments, the service portal interface may present a plurality of available home automation systems 110 from which a user may select a desired home automation system 110. Additionally or alternatively, in some embodiments, a user may provide an indication of a desired home automation system 110, such as account login information for an account with the desired home automation system 110, contact information (e.g., a domain name, IP address, and/or the like) for the desired home automation system 110, and/or other information which may be used by the service portal apparatus 110 to identify and/or contact the selected home automation system 110.

The service portal apparatus 106 may be configured to communicate with the selected home automation system 110 and register the network connected appliance 102 to the selected home automation system 110. In some example embodiments, if the user does not have an existing account with the selected home automation system 110, the service portal apparatus 106 may be configured to create an account with the selected home automation system 110 for the user. In some such embodiments, the service portal apparatus 106 may use information from the user's account with the service portal to create the account with the selected home automation system 110. Additionally or alternatively, in some embodiments, the service portal apparatus 106 may solicit information that may be needed to create the account from the user and the user may supply the information by interacting with the service portal interface via the user terminal 108.

The service portal apparatus 106 may be further configured to enable communication between the network connected appliance 102 and the selected home automation system 110, such that home automation services provided by the selected home automation system 110 may be provided to the network connected appliance 102. For example, in some embodiments, the service portal apparatus 106 may be configured to enable communication between the network connected appliance 102 and the selected home automation system 110, in response to the registration of the network connected appliance 102 to the selected home automation system 110 and/or association of the user's account and the network connected appliance 102 with the selected home automation system 110.

In some example embodiments, enabling communication between the network connected appliance 102 and the selected home automation system 110 may include the service portal apparatus 106 serving as an intermediary for communication between the network connected appliance 102 and the selected home automation system 110. For example, the service portal apparatus 106 of some example embodiments may function as a proxy, which may forward data and/or other communication received from the network connected apparatus 102 that is intended for the selected home automation system 110 to the selected home automation system 110, and vice versa. Additionally or alternatively, in some example embodiments, the service portal apparatus 106 may be configured to provide an interpretation functionality in which the service portal apparatus 106 may translate or otherwise format data and/or other communication received from the network connected apparatus 102 to a format interpretable by the selected home automation system 110 prior to sending the data to the selected home automation system 110. Likewise, the service portal apparatus 106 may translate or otherwise format data and/or other communication received from the selected home automation system 110 to a format interpretable by the network connected apparatus 102 prior to sending the data to the network connected apparatus 102.

In some example embodiments, enabling communication between the network connected appliance 102 and the selected home automation system 110 may include the service portal apparatus 106 remotely configuring the network connected appliance 102 via the network 104 to communicate with the selected home automation system 110. For example, in some embodiments, the service portal apparatus 106 may provision the network connected appliance 102 with software configured to facilitate communication between the network connected appliance 102 and the selected home automation system 110. As another example, in some embodiments, the service portal apparatus 106 may be configured to remotely activate and configure a software module that may be pre-installed on the network connected appliance 102, which may be configured to facilitate communication between the network connected appliance 102 and the selected home automation system 110. In this regard, in some embodiments, the network connected appliance 102 may have a plurality of respective pre-installed software modules, with each software module being associated with a respective home automation system 110. As such, the software module associated with the selected home automation system 110 may be remotely activated by the service portal apparatus 106 of some such example embodiments. Provisioning, activation, and/or configuration of software on the network connected appliance 102 by the service portal apparatus 106 may, for example, be performed via over-the-air (OTA) provisioning techniques.

In some example embodiments, the service portal interface that may be provided by the service portal apparatus 106 may enable a user to enable/disable alerts related to operation of the network connected appliance 102. The user may define a preferred communication mode, such as email, text messaging, and/or the other communication mode by which the user wishes to receive alerts. Additionally or alternatively, in some embodiments, the service portal interface may provide a social community in which users may rate appliances, share experiences with appliances, and/or otherwise interact.

In some example embodiments, the service portal may enable a user to decommission a network connected appliance 102 associated with his or her user account. In this regard, if a user selects to decommission a network connected appliance 102, the service portal apparatus 106 may be configured to disassociate the network connected appliance 102 from the user's account. The service portal apparatus 106 may be further configured to remotely delete any personal data, such as user account data, that may be maintained on the network connected appliance 102.

FIG. 2 illustrates a block diagram of an apparatus 200 that may provide a service portal in accordance with some example embodiments. In this regard, the apparatus 200 may be implemented on the service portal apparatus 106 of some example embodiments. As such, it will be appreciated that elements of the apparatus 200 may be implemented on a single computing device, or, in some embodiments, may be distributed across a plurality of computing devices collectively providing functionality of the service portal apparatus 106 in accordance with one or more example embodiments.

It will be appreciated that the components, devices or elements illustrated in and described with respect to FIG. 2 below may not be mandatory and thus some may be omitted in certain embodiments. Additionally, some embodiments may include further or different components, devices or elements beyond those illustrated in and described with respect to FIG. 2.

In some example embodiments, the apparatus 200 may include processing circuitry 210 that is configurable to perform functions in accordance with one or more example embodiments disclosed herein. In this regard, the processing circuitry 210 may be configured to perform and/or control performance of one or more functionalities of apparatus 200 (e.g., functionalities of the service portal apparatus 106) in accordance with various example embodiments. Thus, the processing circuitry 210 may be configured to perform data processing, application execution and/or other processing and management services according to one or more example embodiments.

In some embodiments, the apparatus 200 or a portion(s) or component(s) thereof, such as the processing circuitry 210, may include one or more chipsets, which may each include one or more chips. The processing circuitry 210 and/or one or more further components of the apparatus 200 may therefore, in some instances, be configured to implement an embodiment on a chipset.

In some example embodiments, the processing circuitry 210 may include a processor 212 and, in some embodiments, such as that illustrated in FIG. 2, may further include a memory 214. The processing circuitry 210 may be in communication with or otherwise control a communication interface 216 and/or service portal module 218.

The processor 212 may be embodied in a variety of forms. For example, the processor 212 may be embodied as various hardware processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 may comprise a plurality of processors. The plurality of processors may be in operative communication with each other and may be collectively configured to perform one or more functionalities of the apparatus 200. In some embodiments in which the apparatus 200 is embodied as a plurality of computing devices, a plurality of processors, which may collectively form the processor 212, may be distributed across a plurality of computing devices that may be in operative communication with each other directly and/or via a network, such as the network 104. In some example embodiments, the processor 212 may be configured to execute instructions that may be stored in the memory 214 and/or that may be otherwise accessible to the processor 212. As such, whether configured by hardware or by a combination of hardware and software, the processor 212 may be capable of performing operations according to various embodiments while configured accordingly.

In some example embodiments, the memory 214 may include one or more memory devices. Memory 214 may include fixed and/or removable memory devices. In embodiments in which the memory 214 includes a plurality of memory devices, the plurality of memory devices may be embodied on a single computing device, or may be distributed across a plurality of computing devices, which may collectively provide functionality of the apparatus 200. In some embodiments, the memory 214 may provide a non-transitory computer-readable storage medium that may store computer program instructions that may be executed by the processor 212. In this regard, the memory 214 may be configured to store information, data, applications, instructions and/or the like for enabling the apparatus 200 to carry out various functions in accordance with one or more example embodiments. In some embodiments, the memory 214 may be in communication with one or more of the processor 212, communication interface 216, or service portal module 218 via a bus(es) for passing information among components of the apparatus 200.

The apparatus 200 may further include a communication interface 216. The communication interface 216 may enable the apparatus 200 to communicate with one or more further computing devices, such as over a network (e.g., network 104). In this regard, the communication interface 216 may include one or more interface mechanisms for enabling communication with other devices and/or networks. As such, the communication interface 216 may include, for example, an antenna (or multiple antennas) and supporting hardware and/or software for enabling communications with a wireless communication network (e.g., a cellular network, Wi-Fi, WLAN, and/or the like) and/or a communication modem or other hardware/software for supporting communication via cable, digital subscriber line (DSL), USB, FireWire, Ethernet, one or more optical transmission technologies, and/or other wireline networking methods. Thus, for example, the communication interface 216 may be configured to enable communication between the service portal apparatus 106 and one or more of a network connected appliance 102, user terminal 108, or home automation system 110 over the network 104.

The apparatus 200 may further include service portal module 218. The service portal module 218 may be embodied as various means, such as circuitry, hardware, a computer program product comprising computer readable program instructions stored on a computer readable medium (for example, the memory 214) and executed by a processing device (for example, the processor 212), or some combination thereof. In some embodiments, the processor 212 (or the processing circuitry 210) may include, or otherwise control the service portal module 218. The service portal module 218 may be configured to control and/or otherwise provide functionality of the service portal interface that may be provided by the service portal apparatus 106 of some example embodiments. The service portal module 218 may additionally or alternatively be configured to perform management functions for managing a network connected appliance 102. In some example embodiments, the service portal module 218 may be configured to register a network connected appliance 102 to a selected home automation system 110 and to enable communication between the network connected appliance 102 and selected home automation system 110.

FIG. 3 illustrates a block diagram of an apparatus 300 that may be implemented on a user device 108 in accordance with some example embodiments. It will be appreciated that the components, devices or elements illustrated in and described with respect to FIG. 3 below may not be mandatory and thus some may be omitted in certain embodiments. Additionally, some embodiments may include further or different components, devices or elements beyond those illustrated in and described with respect to FIG. 3.

In some example embodiments, the apparatus 300 may include processing circuitry 310 that is configurable to perform functions in accordance with one or more example embodiments disclosed herein. In this regard, the processing circuitry 310 may be configured to perform and/or control performance of one or more functionalities of apparatus 300 (e.g., functionalities of user device 108) in accordance with various example embodiments. Thus, the processing circuitry 310 may be configured to perform data processing, application execution and/or other processing and management services according to one or more example embodiments.

In some embodiments, the apparatus 300 or a portion(s) or component(s) thereof, such as the processing circuitry 310, may include one or more chipsets, which may each include one or more chips. The processing circuitry 310 and/or one or more further components of the apparatus 300 may therefore, in some instances, be configured to implement an embodiment on a chipset.

In some example embodiments, the processing circuitry 310 may include a processor 312 and, in some embodiments, such as that illustrated in FIG. 3, may further include memory 314. The processing circuitry 310 may be in communication with or otherwise control a communication interface 316, user interface 318, and/or appliance registration module 320.

The processor 312 may be embodied in a variety of forms. For example, the processor 312 may be embodied as various hardware processing means, such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 may comprise a plurality of processors. The plurality of processors may be in operative communication with each other and may be collectively configured to perform one or more functionalities of the apparatus 300. In some example embodiments, the processor 312 may be configured to execute instructions that may be stored in the memory 314 and/or that may be otherwise accessible to the processor 312. As such, whether configured by hardware or by a combination of hardware and software, the processor 312 may be capable of performing operations according to various embodiments while being configured accordingly.

In some example embodiments, the memory 314 may include one or more memory devices. Memory 314 may include fixed and/or removable memory devices. In some embodiments, the memory 314 may provide a non-transitory computer-readable storage medium that may store computer program instructions that may be executed by the processor 312. In this regard, the memory 314 may be configured to store information, data, applications, instructions and/or the like for enabling the apparatus 300 to carry out various functions in accordance with one or more example embodiments. In some embodiments, the memory 314 may be in communication with one or more of the processor 312, communication interface 316, user interface 318, or appliance registration module 320 via a bus(es) for passing information among components of the apparatus 300.

The apparatus 300 may further include a communication interface 316. The communication interface 316 may enable the apparatus 300 to communicate with one or more further computing devices, such as over a network (e.g., network 104). In this regard, the communication interface 316 may include one or more interface mechanisms for enabling communication with other devices and/or networks. As such, the communication interface 316 may include, for example, an antenna (or multiple antennas) and supporting hardware and/or software for enabling communications with a wireless communication network (e.g., a cellular network, Wi-Fi, WLAN, and/or the like) and/or a communication modem or other hardware/software for supporting communication via cable, digital subscriber line (DSL), USB, FireWire, Ethernet, one or more optical transmission technologies, and/or other wireline networking methods. Thus, for example, the communication interface 316 may be configured to enable communication between the user terminal 108 and one or more of network connected appliance 102 or the service portal apparatus 106 over the network 104.

In some example embodiments, the apparatus 300 may include the user interface 318. The user interface 318 may be in communication with the processing circuitry 310 to receive an indication of a user input and/or to provide an audible, visual, mechanical, or other output to a user. As such, the user interface 318 may include, for example, a keyboard, a mouse, a joystick, a display, a touch screen display, a microphone, a speaker, one or more biometric input devices (e.g., a visual or sensorial tracing device that may track body part or eye movements), and/or other input/output mechanisms. In embodiments wherein the user interface 318 comprises a touch screen display and/or a three-dimensional (3D) display (e.g., a stereoscopic display, holographic display, and/or other display that may display an image that may be perceived by a user to be in 3D with and/or without the assistance of 3D glasses or other separate 3D optical assistance device), the user interface 318 may additionally be configured to detect and/or receive an indication of a touch and/or other movement gesture or other input to the display. The user interface 318 of some example embodiments may be used by a user to interact with the service portal interface that may be provided by the service portal apparatus 106 of some example embodiments.

The apparatus 300 may further include appliance registration module 320. The appliance registration module 320 may be embodied as various means, such as circuitry, hardware, a computer program product comprising computer readable program instructions stored on a computer readable medium (for example, the memory 314) and executed by a processing device (for example, the processor 312), or some combination thereof. In some embodiments, the processor 312 (or the processing circuitry 310) may include, or otherwise control, the appliance registration module 320.

The appliance registration module 320 of some example embodiments may be configured to control a thin client and/or other application, which may be used to access and interact with the service portal interface that may be provided by the service portal apparatus 106 of some example embodiments. Additionally or alternatively, in some example embodiments, the appliance registration module 320 may be configured to interact with a network connected appliance 102, such as to provision the network connected appliance 102 with an identifier that may be used to associate the network connected appliance 102 with a user account with the service portal.

FIG. 4 illustrates a block diagram of an apparatus 400 that may be implemented on an appliance, such as a network connected appliance 102, in accordance with some example embodiments. It will be appreciated that the components, devices or elements illustrated in and described with respect to FIG. 4 below may not be mandatory and thus some may be omitted in certain embodiments. Additionally, some embodiments may include further or different components, devices or elements beyond those illustrated in and described with respect to FIG. 4.

In some example embodiments, the apparatus 400 may include processing circuitry 410 that is configurable to perform functions in accordance with one or more example embodiments disclosed herein. In this regard, the processing circuitry 410 may be configured to perform and/or control performance of one or more functionalities of apparatus 400 (e.g., functionalities of a network connected appliance 102) in accordance with various example embodiments. Thus, the processing circuitry 410 may be configured to perform data processing, application execution and/or other processing and management services according to one or more example embodiments.

In some embodiments, the apparatus 400 or a portion(s) or component(s) thereof, such as the processing circuitry 410, may include one or more chipsets, which may each include one or more chips. The processing circuitry 410 and/or one or more further components of the apparatus 400 may therefore, in some instances, be configured to implement an embodiment on a chipset.

In some example embodiments, the processing circuitry 410 may include a processor 412 and, in some embodiments, such as that illustrated in FIG. 4, may further include memory 414. The processing circuitry 410 may be in communication with or otherwise control a communication interface 416, user interface 418, and/or network service module 420.

The processor 412 may be embodied in a variety of forms. For example, the processor 412 may be embodied as various hardware processing means, such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 412 may comprise a plurality of processors. The plurality of processors may be in operative communication with each other and may be collectively configured to perform one or more functionalities of the apparatus 400. In some example embodiments, the processor 412 may be configured to execute instructions that may be stored in the memory 414 and/or that may be otherwise accessible to the processor 412. As such, whether configured by hardware or by a combination of hardware and software, the processor 412 may be capable of performing operations according to various embodiments while being configured accordingly.

In some example embodiments, the memory 414 may include one or more memory devices. Memory 414 may include fixed and/or removable memory devices. In some embodiments, the memory 414 may provide a non-transitory computer-readable storage medium that may store computer program instructions that may be executed by the processor 412. In this regard, the memory 414 may be configured to store information, data, applications, instructions and/or the like for enabling the apparatus 400 to carry out various functions in accordance with one or more example embodiments. In some embodiments, the memory 414 may be in communication with one or more of the processor 412, communication interface 416, user interface 418, or network service module 420 via a bus(es) for passing information among components of the apparatus 400.

The apparatus 400 may further include a communication interface 416. The communication interface 416 may enable the apparatus 400 to communicate with one or more further computing devices, such as over a network (e.g., network 104). In this regard, the communication interface 416 may include one or more interface mechanisms for enabling communication with other devices and/or networks. As such, the communication interface 416 may include, for example, an antenna (or multiple antennas) and supporting hardware and/or software for enabling communications with a wireless communication network (e.g., a cellular network, Wi-Fi, WLAN, and/or the like) and/or a communication modem or other hardware/software for supporting communication via cable, digital subscriber line (DSL), USB, FireWire, Ethernet, one or more optical transmission technologies, and/or other wireline networking methods. As a non-limiting example, the communication interface 416 of some example embodiments may be configured to enable communication between network connected appliance 102 and one or more of service portal apparatus 106, a user terminal 108, or a home automation system 110 via the network 104.

In some example embodiments, the apparatus 400 may include the user interface 418. The user interface 418 may be in communication with the processing circuitry 410 to receive an indication of a user input and/or to provide an audible, visual, mechanical, or other output to a user. The user interface 418 may include one or more interface mechanisms enabling a user to view operating status information of a network connected appliance 102 and/or to control operation of a network connected appliance 102. Thus, for example, the user interface 418 may include a display, touch screen display, keypad, keyboard, control knob, joystick, microphone, speaker, biometric input device, and/or other input/output mechanism.

The apparatus 400 may further include network service module 420. The network service module 420 may be embodied as various means, such as circuitry, hardware, a computer program product comprising computer readable program instructions stored on a computer readable medium (for example, the memory 414) and executed by a processing device (for example, the processor 412), or some combination thereof. In some embodiments, the processor 412 (or the processing circuitry 410) may include, or otherwise control the network service module 420.

The network service module 420 of some embodiments may be configured to interact with the service portal apparatus 106 to facilitate the provision of management services that may be provided by the service portal apparatus 106 of some example embodiments. Additionally or alternatively, the network service module 420 of some example embodiments may be configured to facilitate the provision of home automation services by a home automation system 110 to a network connected appliance 102.

FIG. 5 illustrates a flowchart according to an example method for configuring a network connected appliance, such as a network connected appliance 102, to use a home automation system, such as a home automation system 110, in accordance with some example embodiments. In this regard, FIG. 5 illustrates operations that may be performed by the service portal apparatus 106 of some example embodiments. One or more of processing circuitry 210, processor 212, memory 214, communication interface 216, or service portal module 218 may, for example, provide means for performing one or more of the operations illustrated in and described with respect to FIG. 5.

Operation 500 may include receiving an indication of a selected home automation system for the network connected appliance. Operation 510 may include registering the network connected appliance to the selected home automation system. Operation 520 may include enabling communication between the network connected appliance and the selected home automation system.

FIG. 6 illustrates a system 600 for associating a network connected appliance with a user account in accordance with some example embodiments. More particularly, the system 600 illustrates an embodiment of a portion of the system 100 to illustrate association of a network connected appliance with a user account of a service portal in accordance with some example embodiments.

The system 600 may include a network connected appliance 602, service portal apparatus 606, and user device 608, which may comprise embodiments of a network connected appliance 102, service portal apparatus 106, and user device 108, respectively. The network connected appliance 602 and user device 608 may be connected to a LAN 610, which may be a home LAN in a home of a user associated with the network connected appliance 602 and user device 608. By way of non-limiting example, the LAN 610 may include a WLAN, a wired LAN, a power line network, some combination thereof, or other LAN.

The LAN 610 may, in turn, be interfaced with the network 604, which may comprise an embodiment of at least a portion of the network 104. In this regard, the network 604 may comprise a wide area network that may include one or more wireline networks, one or more wireless networks, or some combination thereof, and, in some embodiments, may comprise the Internet. The network connected appliance 602 and user device 608 may be configured to communicate with devices external to the LAN 610 via the network 604. Thus, for example, the network connected appliance 602 and user device 608 may be configured to communicate with the service portal apparatus 606 via the network 604.

The user device 608 may be configured to detect a network connected appliance 602 on the LAN 610 that has not been associated with a user account with the service portal apparatus 606. For example, in some embodiments, detection of an unassociated network connected appliance 602 may be performed by and/or with the assistance of an application that may be provided to the user device 608 by the service portal apparatus 606.

The user device 608 may be configured to facilitate association of an unassociated network connected appliance 602 with the user account by provisioning the network connected appliance 602 with an identifier having a predefined association with the user account. In this regard, an identifier having a predefined association with the user account may be known to the service portal apparatus 606 and, when presented to the service portal apparatus 606 by a network connected appliance 602, the service portal apparatus 606 may recognize that the network connected appliance 602 is associated with the user account with which the identifier is associated. As such, the network connected appliance 602 of such example embodiments may communicate with the service portal apparatus 606 via the network 604 and may present the identifier to indicate the user account with which the network connected appliance 602 is associated.

In some example embodiments, provisioning of identifier having a predefined association with the user account to the network connected appliance 602 by the user device 608 may be performed over the LAN 610. For example, in some embodiments, the identifier may be provisioned to the network connected appliance 602 via a transport layer protocol, such as user datagram protocol (UDP), transmission control protocol (TCP), and/or other transport layer protocol that may be used on the LAN 610. In some such embodiments, socket communication over the LAN 610 may be used by the user device 608 to provision the identifier to the network connected appliance 602. For example, in some embodiments, the identifier may be provisioned via a UDP handshake using socket communication.

In some example embodiments, an identifier having a predefined association with the user account that may be provisioned to the network connected appliance 602 may be a VSN that may be generated by the service portal apparatus 606. For example, in some embodiments, a user may select via an application on the user device 608 and/or via the service portal interface to establish a new association between a network connected appliance 602 and the user's account. The service portal apparatus 606 may be configured, in response, to generate a VSN, which may be associated with the user's account, and may provision the VSN to the user device 608. The user device 608 may, in turn, provision the VSN to the network connected appliance 602 via the LAN 610. The network connected appliance 602 may store the VSN, and may present the VSN to the service portal apparatus 606 to establish the association between the network connected appliance 602 and the user's account.

As another example, in some embodiments, the user device 608 may be configured to provision an account identifier, such as an email address, account user name, and/or other identifier that may be used to uniquely identify a user account with the service portal to the network connected appliance 602. The network connected appliance 602 may store the identifier, and may present the identifier to the service portal apparatus 606 to establish the association between the network connected appliance 602 and the user's account.

In some example embodiments, a user of the user device 608 may be logged into his or her account with the service portal at a time when the network connected appliance 602 is provisioned with the identifier having a predefined association with the user's account and/or when the network connected appliance 602 presents the identifier to establish the association between the network connected appliance 602 and the user's account. For example, in some such embodiments, the user may indicate to the service portal interface that a network connected appliance is to be added to the account so that the service portal apparatus 606 expects to receive a communication from network connected appliance 602 providing an identifier to establish an association between the network connected appliance 602 and the user account. The user being logged into the account may be used by the service portal apparatus 606 to provide a layer of security that a network connected appliance 602 being associated with the user account is properly associated with the user. Further, the user device 608 and network connected appliance 602 being on the same LAN to enable provisioning of the identifier to the network connected appliance 602 may provide an additional layer of security that the user adding the network connected appliance 602 to his or her account owns and/or is otherwise properly associated with the network connected appliance 602.

FIG. 7 illustrates a flowchart according to an example method that may be performed by a user device, such as user device 608, to facilitate establishment of an association between a network connected appliance 602 and a user account in accordance with some example embodiments. One or more of processing circuitry 310, processor 312, memory 314, communication interface 316, user interface 318, or appliance registration module 320 may, for example, provide means for performing one or more of the operations illustrated in and described with respect to FIG. 7.

Operation 700 may include the user device 608 identifying a network connected appliance 602 on the LAN 610 that is not associated with the user account. Operation 710 may include the user device 608 provisioning the network connected appliance 602 with an identifier associated with the user account. The identifier may include an account identifier, such as an email address, account user name, and/or other identifier that may be used to uniquely identify a user account. Additionally or alternatively, the identifier may include a VSN, which may be generated by the service portal apparatus 606 on demand to enable association of a new appliance with the user account and which may be provisioned to the user device 608 prior to being provisioned to the network connected appliance 602.

FIG. 8 illustrates a flowchart according to an example method that may be performed by a network connected appliance, such as network connected appliance 602, to establish an association between the network connected appliance and a user account in accordance with some example embodiments. One or more of processing circuitry 410, processor 412, memory 414, communication interface 416, user interface 418, or network service module 420 may, for example, provide means for performing one or more of the operations illustrated in and described with respect to FIG. 8.

Operation 800 may include the network connected appliance 602 an identifier associated with the user account. The received identifier may, for example, be an identifier that may be provisioned to the network connected appliance 602 by the user device 608 attendant to performance of operation 710.

Operation 810 may include the network connected appliance 602 sending the identifier to the service portal (e.g., to the service portal apparatus 606) to establish an association between the network connected appliance and the user account.

FIG. 9 illustrates a flowchart according to an example method that may be performed by the service portal apparatus 606 to establish an association between a network connected appliance, such as network connected appliance 602, and a user account in accordance with some example embodiments. One or more of processing circuitry 210, processor 212, memory 214, communication interface 216, or service portal module 218 may, for example, provide means for performing one or more of the operations illustrated in and described with respect to FIG. 9.

Operation 900 may include receiving an identifier associated with a user account. For example, the received identifier may be an identifier that may be sent by the network connected appliance 602 attendant to performance of operation 810. The service portal apparatus 606 may determine the user account with which the identifier is associated.

Operation 910 may include the service portal apparatus 910 establishing an association between the network connected appliance and the user account based at least in part on the identifier.

It will be understood that each block of the flowcharts in FIGS. 5 and 7-9, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which may embody the procedures described herein may be stored by one or more memory devices of a computing device, such as a network connected appliance 102, service portal apparatus 106, user device 108, network connected appliance 602, service portal apparatus 606, and/or user device 608, and executed by a processor (e.g., processor 212, processor 312, and/or processor 412) in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s). Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

Moreover, it will be appreciated that the ordering of blocks and corresponding method operations within the flowchart is provided by way of non-limiting example in order to describe operations that may be performed in accordance some example embodiments. In this regard, it will be appreciated that the ordering of blocks and corresponding method operations illustrated in the flowchart is non-limiting, such that the ordering of two or more block illustrated in and described with respect to the flowchart may be changed and/or method operations associated with two or more blocks may be at least partially performed in parallel in accordance with some example embodiments. Further, in some embodiments, one or more blocks and corresponding method operations illustrated in and described with respect to the flowchart may be optional, and may be omitted.

Functions in accordance with the above described embodiments may be carried out in many ways. In this regard, any suitable means for carrying out each of the functions described above may be employed to carry out various embodiments. In some embodiments, a suitably configured processor (e.g., processor 212, processor 312, and/or processor 412) may provide all or a portion of the elements. In other embodiments, all or a portion of the elements may be configured by and operate under control of a computer program product. The computer program product for performing the methods of various embodiments of includes at least one computer readable storage medium having computer readable program code stored thereon. The computer readable medium (or media) may, for example, be embodied as and/or otherwise include the memory 214, memory 314, and/or memory 414. However, it will be appreciated that a computer program product in accordance with various example embodiments may include any data storage device (e.g., a non-transitory computer readable storage medium) that can store data, which can be thereafter read by a computer system. Examples of the computer readable storage media include hard drives, network attached storage (NAS), read-only memory, random-access memory, one or more digital versatile disc (DVDs), one or more compact disc read only memories (CD-ROMs), one or more compact disc-recordable discs (CD-Rs), one or more compact disc-rewritable discs (CD-RWs), one or more Blu-Ray discs, magnetic tapes, flash memory, some combination thereof, and/or other optical and non-optical data storage devices. Some example embodiments may additionally or alternatively use computer readable storage media distributed over a network coupled computer system such that the computer readable code may be stored and executed in a distributed fashion.

It will be appreciated that the various aspects, embodiments, implementations and features of the described embodiments may be used separately or in any combination. Various aspects of the described embodiments may be implemented via computer program product, which may be provided via a computer-readable medium, such as memory 314 and/or memory 414, storing software and/or firmware, hardware, or a combination of hardware and software.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

What is claimed is:

1. A computing device for associating a network connected appliance with a user account, the computing device comprising:
   a communication interface configured to connect the computing device to a local area network;
   a memory configured to store computer program instructions; and
   a processor configured to access the memory, and execute the computer program instructions to cause the computing device to at least:
   identify a network connected appliance connected to the local area network that is not associated with the user account, when the computing device is connected to the local area network; and
   provision the network connected appliance with an identifier associated with the user account, wherein the identifier is usable by the network connected appliance to send to a service portal to establish an association between the network connected appliance and the user account.

2. The computing device of claim 1, wherein the identifier is an email address.

3. The computing device of claim 1, wherein the identifier is a virtual serial number (VSN) associated with the user account, and the processor is configured to execute the computer program instructions to further cause the computing device to at least:
   send an indication to the service portal that a new network connected appliance is to be associated with the user account; and
   receive the VSN in response to the indication, the VSN generated by the service portal in response to the indication.

4. The computing device of claim 1, wherein processor is configured to execute the computer program instructions to further cause the computing device to at least:
   access the service portal under the user account.

5. The computing device of claim 1, wherein the computing device caused to provision the network connected appliance with the identifier includes the computing device caused to use a transport layer protocol to send the identifier to the network connected appliance over the local area network.

6. The computing device of claim 5, wherein the transport layer protocol comprises one of user datagram protocol (UDP) or transmission control protocol (TCP).

7. The computing device of claim 1, wherein the computing device caused to provision the network connected appliance with the identifier includes the computing device caused to send the identifier to the network connected appliance via socket communication over the local area network.

8. A method for associating a network connected appliance with a user account, the method comprising a computing device:
   identifying a network connected appliance connected to a local area network that is not associated with the user account, when the computing device is connected to the local area network; and
   provisioning the network connected appliance with an identifier associated with the user account, wherein the identifier is usable by the network connected appliance to send to a service portal to establish an association between the network connected appliance and the user account, and
   wherein at least one method operation is performed by a processor.

9. The method of claim 8, wherein the identifier is an email address.

10. The method of claim 8, wherein the identifier is a virtual serial number (VSN) associated with the user account, and the method further comprises the computing device:
    sending an indication to the service portal that a new network connected appliance is to be associated with the user account; and
    receiving the VSN in response to the indication, the VSN generated by the service portal in response to the indication.

11. The method of claim 8, further comprising the computing device:
    accessing the service portal under the user account.

12. The method of claim 8, wherein provisioning the network connected appliance with the identifier comprises using a transport layer protocol to send the identifier to the network connected appliance over the local area network.

13. The method of claim 12, wherein the transport layer protocol comprises one of user datagram protocol (UDP) or transmission control protocol (TCP).

14. The method of claim 8, wherein provisioning the network connected appliance with the identifier comprises sending the identifier to the network connected appliance via socket communication over the local area network.

15. A method for associating a network connected appliance with a user account, the method comprising the network connected appliance:
    receiving an identifier associated with a user account from a computing device, when the network connected appliance and the computing device are connected to a local area network, and the network connected appliance is not associated with the user account; and
    sending the identifier to a service portal to establish an association between the network connected appliance and the user account, and
    wherein at least one method operation is performed by a processor.

16. The method of claim 15, wherein the identifier is an email address.

17. The method of claim 15, wherein the identifier is a virtual serial number (VSN) associated with the user account, generated by the service portal in response to an indication from the computing device that a new network connected appliance is to be associated with the user account.

18. The method of claim 15, wherein receiving the identifier comprises using a transport layer protocol to receive the identifier over the local area network.

19. The method of claim 18, wherein the transport layer protocol comprises one of user datagram protocol (UDP) or transmission control protocol (TCP).

20. The method of claim 15, wherein receiving the identifier comprises receiving the identifier via socket communication over the local area network.

* * * * *